(12) United States Patent
Shuber

(10) Patent No.: US 12,522,865 B2
(45) Date of Patent: Jan. 13, 2026

(54) NUCLEIC ACID ENRICHMENT METHOD

(71) Applicant: Harbinger Health, Inc., Cambridge, MA (US)

(72) Inventor: Anthony P. Shuber, Northbridge, MA (US)

(73) Assignee: Harbinger Health, Inc., Cambridge, MA (US)

(*) Notice: Subject to any disclaimer, the term of this patent is extended or adjusted under 35 U.S.C. 154(b) by 476 days.

(21) Appl. No.: 18/030,412

(22) PCT Filed: Oct. 4, 2021

(86) PCT No.: PCT/US2021/053384
§ 371 (c)(1),
(2) Date: Apr. 5, 2023

(87) PCT Pub. No.: WO2022/076313
PCT Pub. Date: Apr. 14, 2022

(65) Prior Publication Data
US 2023/0366014 A1     Nov. 16, 2023

Related U.S. Application Data

(60) Provisional application No. 63/087,964, filed on Oct. 6, 2020.

(51) Int. Cl.
*C12Q 1/68*     (2018.01)
*C12Q 1/6806*   (2018.01)
(Continued)

(52) U.S. Cl.
CPC ......... *C12Q 1/6848* (2013.01); *C12Q 1/6806* (2013.01); *C12Q 1/6855* (2013.01); *C12Q 1/6876* (2013.01); *C12Q 2600/16* (2013.01)

(58) Field of Classification Search
None
See application file for complete search history.

(56) References Cited

U.S. PATENT DOCUMENTS 9,163,284 B2 *   10/2015   Liu ..................... C12Q 1/6816
2004/0209299 A1 * 10/2004  Pinter ................ C12N 15/1093
                                                    536/25.4

(Continued)

FOREIGN PATENT DOCUMENTS

WO     2019083449 A1     5/2019
WO     2020120711 A1     6/2020

OTHER PUBLICATIONS

International Search Report and Written Opinion for International Patent Application No. PCT/US2021/053384, mailed Feb. 7, 2022 (8 pages).

*Primary Examiner* — Aaron A Priest
(74) *Attorney, Agent, or Firm* — Goodwin Procter LLP

(57) ABSTRACT

The invention provides methods of detecting genetic features that only require a single successful interrogation. A sample that includes nucleic acid may have a first set of adaptors ligated to free ends in a manner that is not target specific. Then, a reagent such as a Cas endonuclease is used to cut nucleic acid molecules that contain a target of interest, leaving a cut end. A second adaptor type is attached to the cut end(s) and provides a primer binding site. A primer bound to the second adaptor site is extended through the target of interest and through a strand of the first adaptor. This extension yields a template polynucleotide that includes the primer, the copy of the target, and the copy of the first adaptor.

24 Claims, 6 Drawing Sheets

(51) Int. Cl.
*C12Q 1/6848* (2018.01)
*C12Q 1/6855* (2018.01)
*C12Q 1/6876* (2018.01)

(56) References Cited

U.S. PATENT DOCUMENTS

2017/0073747 A1* 3/2017 Joung ................ C12N 15/1093
2018/0312830 A1* 11/2018 Gourguechon .... C12N 15/1093
2019/0360043 A1 11/2019 Pham et al.
2020/0131561 A1 4/2020 Kennedy et al.
2020/0157599 A9 5/2020 Shuber
2020/0248234 A1 8/2020 Namsaraev et al.

* cited by examiner

Adapter 1
5'-ACTATTCAGGGGTAATAACGTATGCGGCTGTGCTA*T-3' (SEQ ID NO: 1)
3'-ddGCCCGACACGAT[Phos]-5' (SEQ ID NO: 2)

Non-specific Primer: ACTATTCAGGGGTAATAACGTAT-3' (SEQ ID NO: 3)

Adapter 2
5'-GCGGTCCCAAAAGGGTCAGT*T-3' (SEQ ID NO: 4)
3'-CGCCAGGGTTTTCCCAGTCA[Phos]-5' (SEQ ID NO: 5)

UPS Primer: 5'-GCGGTCCCAAAAGGGTCAGTT-3' (SEQ ID NO: 6)

FIG. 3 cfDNA-specific CAMP Reaction 1 cfDNA-specific CAMP Reaction 2

NUCLEIC ACID ENRICHMENT METHOD

TECHNICAL FIELD

The invention relates to capture and detection of genetic material of interest such as mutations associated with medical conditions.

BACKGROUND

A common issue in medical genetics and oncology is that clinically significant genetic features require methods of detection and analysis that are exquisitely specific and require laboratory methods that have limited specificity, or are very costly.

For example, when using polymerase chain reaction (PCR) to interrogate for a mutation of interest, not only must one know beforehand two complete primer binding sites that flank the mutation, the primers must have matched melting temperatures. Not only that, but analysis will only be successful if a sample includes enough intact DNA that includes both primer binding sites and the mutation. This is a limiting paradigm because it only even works if the sample conforms to the expectation of "normal" or "healthy" genetics. If a chromosome has been rearranged or transposed, the sample will not even include primer binding sites on contiguous DNA flanking the mutation. Those genetic problems with the greatest potential clinical significance cannot be found by the preferred PCR approach.

Hybrid capture is unsatisfactory because two amplifications and many costly complexes are required. Due to inefficiencies in binding, hybrid capture requires experiments to be set up with great molar excess of probe and also assumes that a large proportion of a target of interest will simply never be hybridized to probe. Clearly, hybrid capture is not promising where a clinically significant feature will only be present as a very rare species in the sample.

SUMMARY

The invention provides methods of detecting genetic features that only require a single successful interrogation by a targeting complex such as a Cas endonuclease with a guide RNA, while provide amplification and library preparation features associated with PCR or traditional fragmentation and adaptor ligation for sequencing platforms. A sample that includes nucleic acid may have a first set of adaptors ligated to free ends in a manner that is not target specific. Then, a reagent such as a Cas endonuclease is used to cut nucleic acid molecules that contain a target of interest, leaving a cut end. A second adaptor type is attached to the cut end(s) and provides a primer binding site. A primer bound to the second adaptor site is extended through the target of interest and through a strand of the first adaptor. This extension yields a template polynucleotide that includes the primer, the copy of the target, and the copy of the first adaptor. Another primer (with a sequence that matches part of the copied strand of the first adaptor) is annealed to the copy of the first adaptor in the template polynucleotide. From there, PCR can proceed using those primers.

The method uncouples PCR amplification conditions from the identity of the target in the sample nucleic acid. PCR is governed predominantly by the length and GC % of the primers, even though one primer site is created by gRNA recognizing the presence of the target in one of the molecules. Thus, even when multiple molecules are interrogated in parallel, the amplifications can be performed under a single protocol and even multiplexed in a single-pot, if desired. The method will successfully amplify by PCR templates that include a single target without the requirement of the pair of target primer binding sites required by target detection by PCR.

The methods employ the RNA type from clustered regular interspersed repeats (CRISPR) from bacteria and CRISPR-Associated (Cas) endonuclease to hybridize to short targets and make a cut end that can be attached to a primer binding site. Target detection only requires 1 instance of a target of interest to be present in sample.

The specificity of gRNA and the requirement of no more than 1 target means that target capture, enrichment, and amplification is very sensitive and specific. Methods of the disclosure are very useful for capturing target where the target is present as a very rare species (e.g., of mutant) among a predominant type (e.g., wild-type). In fact, by virtue of gRNA guiding the cut end that attaches to a primer binding site, methods of the invention essentially ignore the predominant non-target. This makes methods of the invention very good for detecting rare mutations (such as tumor-associated fusions) in samples such as in cell-free DNA (cfDNA) in blood or plasma.

Aspects provide nucleic acid enrichment method that include ligating ends of nucleic acid molecules to copies of an adaptor in which one strand includes a sequence of a first primer; cutting an adaptor-ligated molecule that includes a target of interest; ligating a binding site for a second primer to a cut end of the molecule that includes the target; annealing a second primer to the binding site and extending the primer to yield a polynucleotide that includes the primer, a copy of the target, and a copy of the first primer sequence; and amplifying the polynucleotide using copies of the first primer and the second primer.

Other aspects provide a method that includes obtaining a sample comprising a nucleic acid molecule that includes a target of interest; ligating adaptors that include a sequence of a first primer sequence to ends of the nucleic acid molecule; cleaving the nucleic acid molecule with a Cas endonuclease and a guide RNA specific for the target of interest to leave the nucleic acid molecule with a cut end; attaching a binding site for a second primer to the cut end; annealing the second primer to the binding site; and extending the second primer to create a polynucleotide that includes the second primer, a copy of the target of interest, and a binding site for the first primer.

In other aspects, the disclosure provides a reagent kit for detecting a target nucleic acid, the kit comprising: a first set of duplex adaptors, each first duplex adaptor comprising (i) a long strand that includes a sequence of a first amplification primer and a three prime T overhang, and (ii) a short strand that is does not include a full complement to the sequence; a set of guide RNAs that, when complexed with a Cas endonuclease, guide the Cas endonuclease to a target of interest in a nucleic acid molecule; a second set of duplex adaptors, each second duplex adaptor comprising at least one strand with a binding site for a second a primer and a three prime T overhang. The kit may include one of or more Cas endonucleases, copies of the first primer, and copies of the second primer; one or more of dA-tailing enzyme, ligase, polymerase; a plurality of variants of the second primer, wherein each second primer is chimeric and includes a five prime portion complementary to the binding site in the second duplex and a three prime portion complementary to a respective one of a plurality of molecular targets of interest; and/or a plurality of sets of guide RNAs, each gRNA including a targeting segment complementary to a respective one of the plurality of molecular targets.

BRIEF DESCRIPTION OF THE DRAWINGS

FIG. 3 shows a first duplex adaptor labeled adaptor 1.

DETAILED DESCRIPTION

Figure 1:
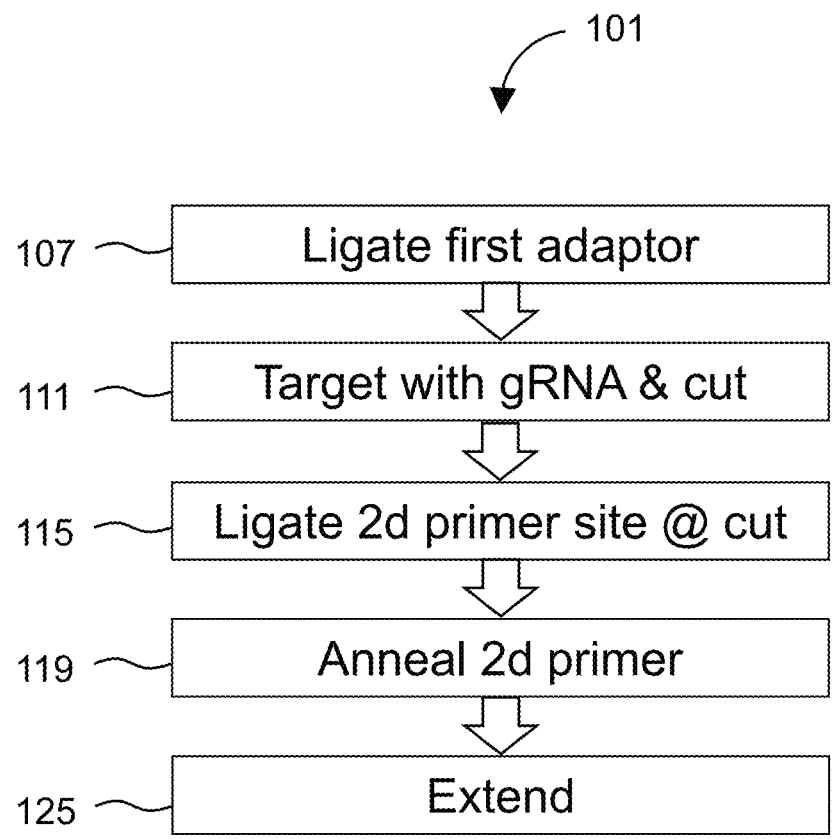
FIG. 1 diagrams a nucleic acid enrichment method.

FIG. 1 diagrams a nucleic acid enrichment method 101. The method 101 includes ligating 107 ends of nucleic acid molecules to copies of an adaptor in which one strand includes a sequence of a first primer; cutting 111 an adaptor-ligated molecule that includes a target of interest; ligating 115 a binding site for a second primer to a cut end of the molecule that includes the target; annealing 119 a second primer to the binding site and extending 125 the primer to yield a polynucleotide that includes the primer, a copy of the target, and a copy of the first primer sequence; and preferably amplifying the polynucleotide using copies of the first primer and the second primer. The method may include, first, obtaining a sample from a subject, the sample comprising the nucleic acid molecules. In some embodiments, the sample is a blood or plasma sample and the nucleic acid molecules comprise cell-free DNA (cfDNA) in the blood or plasma.

Figure 2:
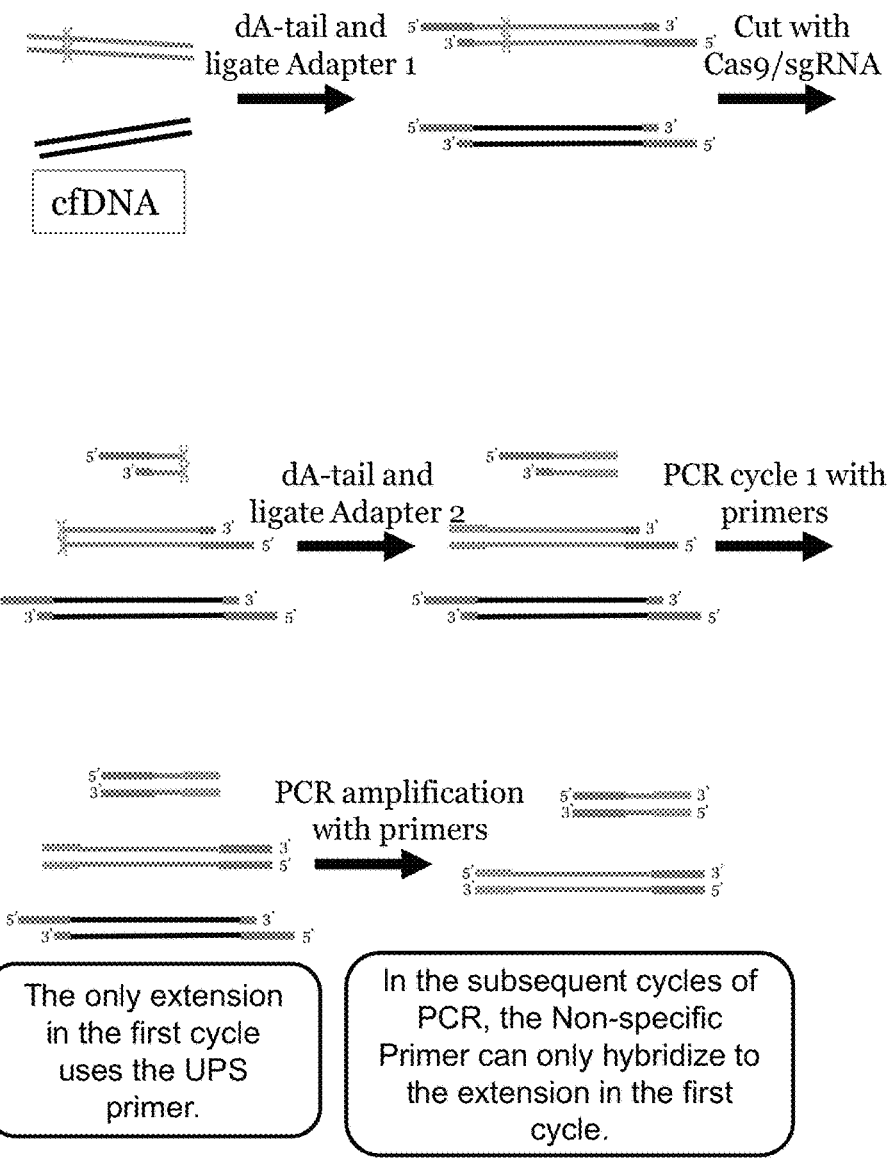
FIG. 2 shows how the method proceeds according to certain embodiments.

FIG. 2 shows how the method 101 proceeds according to certain embodiments. In the depicted embodiment, a sample is obtained such as a blood or plasma sample from a patient. The sample includes cfDNA. Some of the cfDNA includes a target of interest, marked as Xs on the fragments. Molecules that include the target of interest (X) are drawn in lighter gray.

Reagents are used (such as from a commercially available kit) to dA tail cfDNA in the sample. Copies of adaptor 1 are ligated to the dA tailed cfDNA molecules. Preferably, adaptor 1 is a duplex adaptor in which one strand includes the sequence of a first primer.

FIG. 3 shows a first duplex adaptor labeled adaptor 1. Adaptor 1 includes (i) a long strand that includes a sequence of a first amplification primer and a 3' T overhang, and (ii) a short strand that is does not include a full complement to the sequence. As shown, the short strand as a 3' dideoxy terminus. This means that in the presence of polymerase and dNTPs, the short strand of adaptor 1 will not be extended to form a copy of the long strand.

As shown in FIG. 3, a first primer, labeled "non-specific primer", has a sequence that is also found in the long strand of adaptor 1. However the first primer will not interact with adaptor 1 or with adaptor ligated molecules that have been ligated to adaptor 1 because no part of such adaptor ligated molecules is complementary to the first primer.

With reference back to FIG. 2, the molecules of cfDNA are incubated with reagents that target specific molecular targets. In preferred embodiments, Cas endonuclease and guide RNAs are introduced in which the gRNAs have targeting portions that hybridize to a mutation of interest in the adaptor-ligated cfDNA molecules. Thus in certain embodiments the cutting step is performed by introducing a Cas endonuclease and a guide RNA (gRNA) that specifically targets the Cas endonuclease to the target of interest in one strand of the adaptor-ligated molecule.

The Cas endonuclease cleaves, or cuts, those molecules that include the target of interest. Remembering that those molecules have already been subject to adaptor-ligation, this means that molecules that include the target of interest will have adaptor 1 ligated at one end and will now have a free, cut end. The cut ends are dA tailed and adaptor 2 (e.g., see FIG. 3) is ligated.

The specific sequences shown in FIG. 3 do not define or limit the invention. Those sequences illustrate how the method proceeds. Adaptor 2 includes the binding site for (or at least a majority of a binding site for . . . ) a second primer. As shown, the second primer is a universal primer. In a first embodiment, the second primer is universal in that it anneals to a synthetic adaptor (and not by design to a naturally occurring sequence). Universal primers can be multiplexed and protocols may operate that use 2 or 20 or 60 or hundreds of universal primers, all in one pot. What is significant is that each universal primer anneals to its cognate sequence (at least substantially) in a synthetic adaptor. In a related embodiment, chimeric primers are used for the second primer. In a chimeric primer, a few bases at a 3' end of the UPS bind to a target in the natural DNA, and a majority of bases in the primer bind to a cognate synthetic adaptor.

Once adaptor 2 is ligated to the cut ends (see FIG. 2) one cycle of "PCR", or amplification" is performed.

Specifically, the method 101 proceeds by annealing the second primer to the binding site (provided by adaptor 2); and extending the second primer to create a polynucleotide that includes: the second primer, a copy of the target of interest, and a binding site for the first primer.

As shown in in the lower left of FIG. 2, the only primer binding that occurs is of the second primer to molecules that include the target and have been successfully cut by Cas and ligated to adaptor 2. Interestingly, the use of Cas and gRNA to address specific targets allows for targeting a very short region (e.g., about 30 bases with spCas9) but, when followed by adaptor-ligation as shown, nevertheless provides for primer annealing and downstream PCR amplification. Thus, the depicted method allows for a PCR-style amplification and library preparation with great flexibility as to targets and target length, including that melting temperature of PCR is uncoupled from target identity, such as GC % along the target itself.

Once the depicted extension 125 occurs, the product is a polynucleotide that includes: the second primer, a copy of the target of interest, and a binding site for the first primer. The first primer (e.g., SEQ ID NO: 3 in FIG. 3) can be annealed to this product and extended to create a second extension product. Because that second extension product will include a complementary copy of the second primer, instances of the second primer will anneal to that second extension product. AS a consequence, the polynucleotide can be amplified by PCR with the first and second primer. Thus, the method 101 may include amplifying the polynucleotide using copies of the first primer and the second primer.

Notable features that may be included to support successful implementations of method 101 include that adaptor 1 may be double stranded, with a first strand that includes the sequence of the first primer and a second strand that does not include a full complement to the sequence of the first primer. Preferably, adaptor 1 comprises a second strand that is shorter than the one strand and lacks sequence that is fully complementary to the sequence of the first primer. The second strand of the adaptor 1 may include a 3' dideoxy terminus, so that the short strand of adaptor 1 cannot be extended by polymerase.

In preferred embodiments, the sample is a blood or plasma sample from a patient and the nucleic acid molecule is cfDNA in the blood or plasma sample.

In other, multiplexed embodiments, the second primer is chimeric and will only be extended by polymerase when at least one three prime base of the second primer anneals to a base of the nucleic acid molecule while a five prime majority of bases of the second primer anneal to the binding site.

The invention also provides a reagent kit for detecting a target nucleic acid, the kit comprising: a first set of duplex adaptors, each first duplex adaptor; a set of guide RNAs that, when complexed with a Cas endonuclease, guide the Cas endonuclease to a target of interest in a nucleic acid molecule; a second set of duplex adaptors, each second duplex adaptor comprising at least one strand with a binding site for a second a primer and a three prime T overhang.

The kit may include, or the method 101 may use, one of or more Cas endonucleases, copies of the first primer, and copies of the second primer. A kit may include one or more of dA-tailing enzyme, ligase, polymerase. In chimeric embodiments, a kit may include a plurality of variants of the second primer, wherein each second primer is chimeric and includes a five prime portion complementary to the binding site in the second duplex and a three prime portion complementary to a respective one of a plurality of molecular targets of interest. A kit may include a plurality of sets of guide RNAs, each gRNA including a targeting segment complementary to a respective one of the plurality of molecular targets.

It will be appreciated that the invention provides a sensitive method for target capture. After target molecules are adaptor ligated, gRNA targets specific targets for cleavage, leaving a cut end. A 2d round of adaptors is ligated to the cut end, creating a template that is susceptible to copying by priming with a second primer, supporting downstream amplification.

In some embodiments, the method is strand specific in the sense that gRNAs anneal to targets in an identified sense. The method 101 may include performing all of the recited steps as reaction 1 while also performing all of the recited steps as reaction 2 but with reaction 2 using gRNA targeted to the "other" strand of the target molecule.

Figure 4:
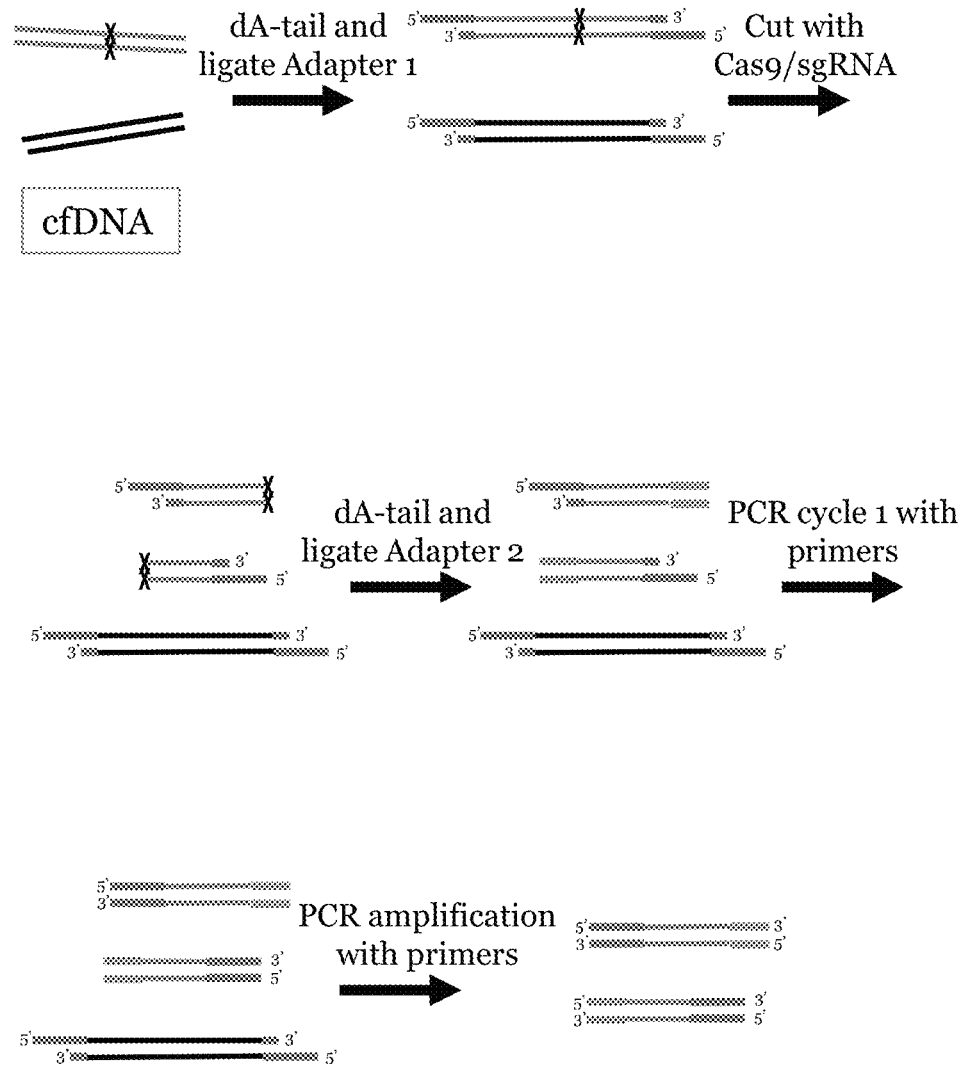
FIG. 4 diagrams a second reaction.

FIG. 4 diagrams Reaction 2. In the depicted embodiment, the method 101 further includes performing a second set of reactions that includes a second set of all of the recited steps, wherein the second cutting step is performed by introducing a second Cas endonuclease and a second gRNA that specifically targets the second Cas endonuclease to a second target in a strand of the adaptor-ligated molecule that is complementary to the one strand.

The depicted embodiments generally include methodologies that may be referred to CRISPR Associated Multiplex PCR (CAMP) or chimeric-primed CAMP (cCAMP). An important features of CAMP is that a gRNA is used to cut target to provide a primer binding site (uncoupled from melting T of tradition PCR primers). Because the primer annealing and extension depends essentially only on the second primer and its binding site (e.g., adaptor 2), multiple targets can be run in multiplex and will successfully amplify even using a thermocycler set to a single time and temperature protocol.

Because each target molecule of interest can be targeted by a Reaction 1, specific to one strand of the ds cfDNA molecule), as well as a Reaction 2 (specific to a strand of the ds cfDNA molecule complementary to the one strand), the invention provides methods that can capture— for amplification—every target, feature, or mutation of interest.

Figure 5:
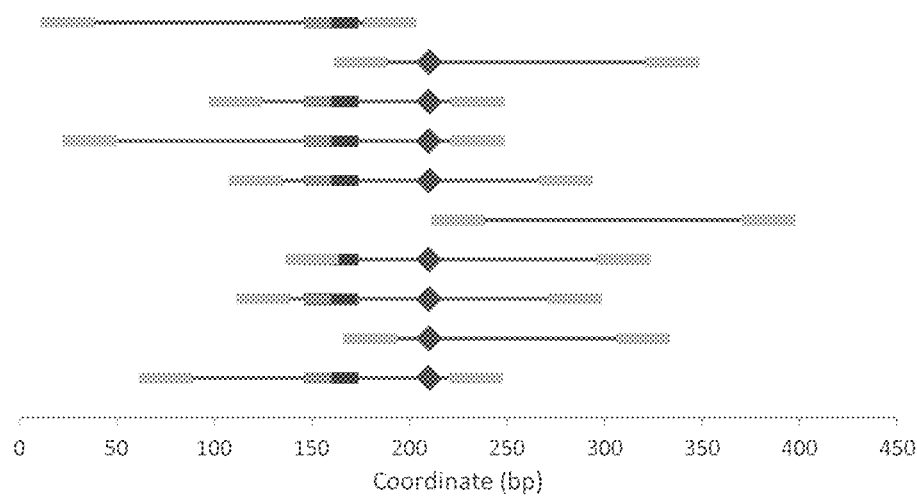
FIG. 5 shows performing two reactions to address both strands
Figure 5:
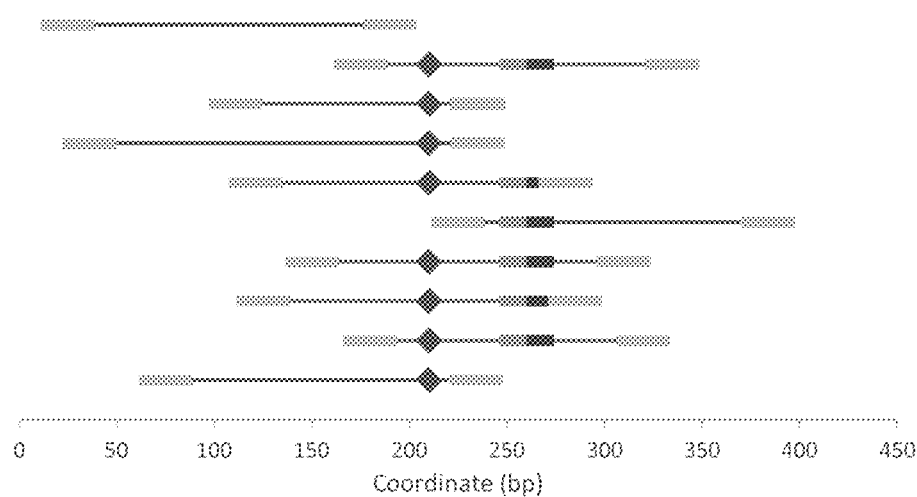
Figure 5:
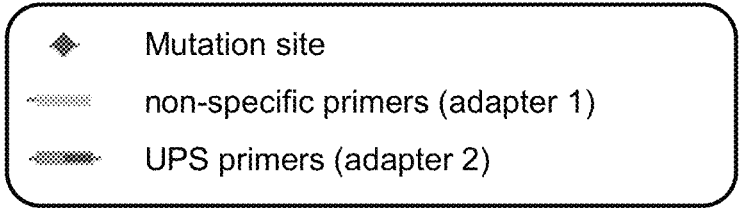

FIG. 5 shows that when a Reaction 1 and a Reaction 2 are preformed, every molecule that includes a "mutation" (or target, or feature of interest is successfully captured by the method 101. For each molecule, both ends are ligated to adaptor 1. If the "mutation" of interest is present, Cas endonuclease cuts one of the strands in Reaction 1, leaving a molecule with a cut end that is successfully amplified.

In the top panel of FIG. 5, the third, fourth, and fifth molecules are successfully captured by Reaction 1. In the bottom panel, the seventh, eighth, and ninth molecules are successfully captured by Reaction 2. Performing 2 reactions reconciles the inherit strandedness of Cas cleavage with the ds nature of DNA in biological samples. All targets of interest are captured for amplification.

In preferred embodiments, the mutation comprises a fusion. Fusions are a mutation or variant type resulting from a rearrangement or deletion and are commonly equivalent to a loss of heterozygosity (LoH) of some otherwise intact segment of genetic material. Because LoH can be a driver of a tumor (i.e., is oncogenic), the presence of the fusion is a marker of the persistence or continuing presence of cancer. Because a gRNA can be designed to target a fusion, and because tumors shed abundant DNA as cfDNA, and because the shed cf DNA includes the fusions, the method 101 can be used to capture, isolate, enrich for and/or detect the fusions in a blood or plasma sample, as a measure of the presence of cancer.

In preferred embodiments, the cutting step is performed by introducing a Cas endonuclease and a guide RNA (gRNA) that specifically targets the Cas endonuclease to the fusion.

To target the fusions, a method of the invention may include sequencing tumor DNA from a tumor in a patient to obtain sequence reads, analyzing the sequence reads to discover the presence of the fusion in the tumor DNA, and designing the gRNA to specifically target the fusion.

Figure 6:
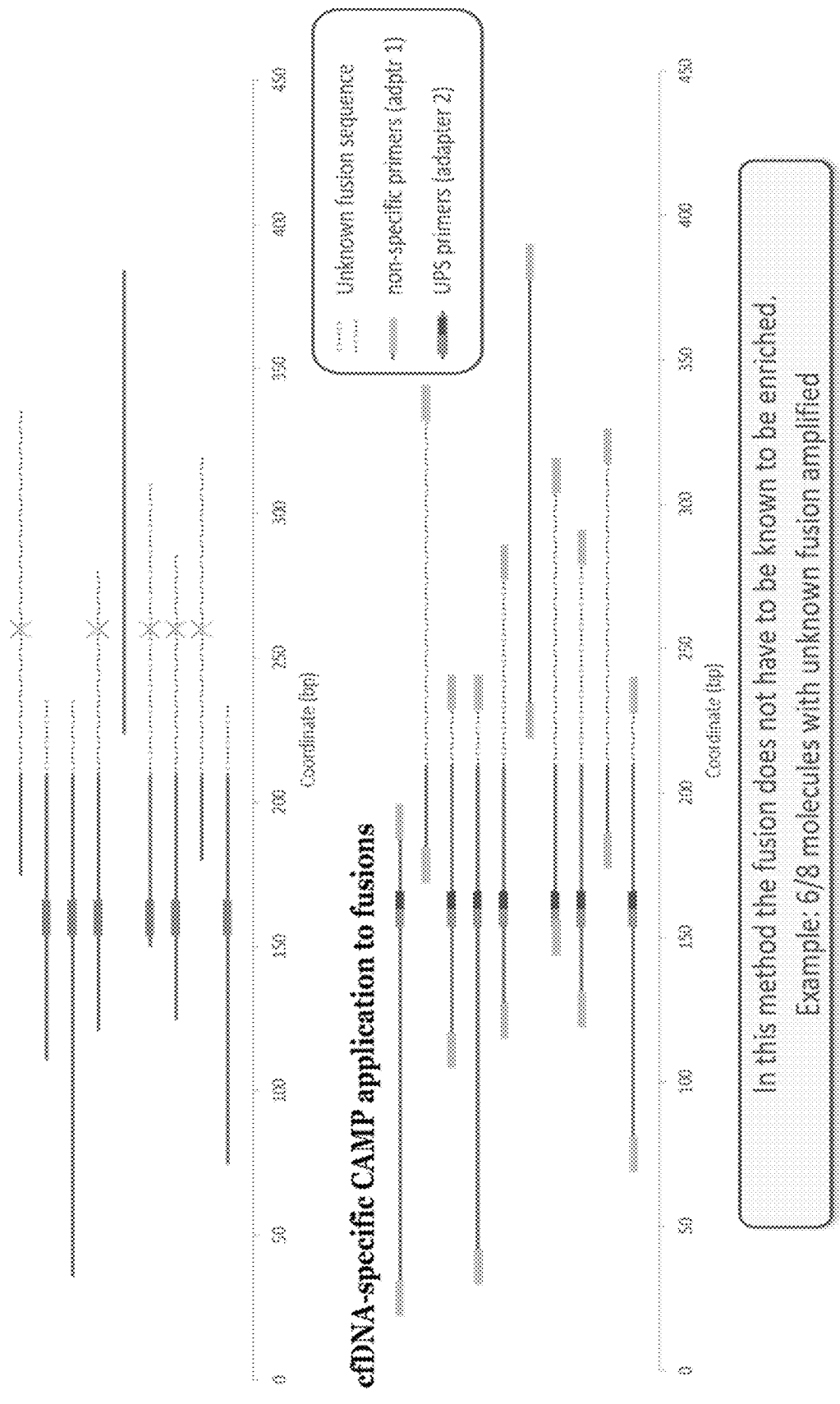
FIG. 6 shows capture of a fusion.

FIG. 6 shows that the method 1010 may be used to capture and amplify a fusion.

Thus the invention provides a method that includes obtaining a sample comprising a nucleic acid molecule that includes a target of interest; ligating adaptors that include a sequence of a first primer to ends of the nucleic acid molecule; cleaving the nucleic acid molecule with a Cas endonuclease and a guide RNA specific for the target of interest to leave the nucleic acid molecule with a cut end; attaching a binding site for a second primer to the cut end; annealing the second primer; and extending the primer to create a template (second primer+copy of target+binding site for first primer) for downstream analysis. The template may be amplified to produce amplicons.

In fusion discovery embodiments, the method may include sequencing an amplicon produced by the amplifying step to yield sequence reads, mapping the sequence reads to a reference, and reporting discovery of a fusion when sequence reads from one amplicon map to non-contiguous locations of the reference.

In cancer monitoring embodiments, the target of interest may be a mutation specific for a tumor from the patient. The method may include detecting or analyzing the polynucleotide to indicate the presence of the tumor in the patient.

In preferred embodiments, the ligating steps include dA tailing available ends optionally after end repair, and incubating with a ligase. Preferably the step of ligating the binding site for the second primer includes ligating a second adaptor that is double-stranded in which one strand includes the binding site for the second primer. For multiplexing, the second primer may be a chimeric primer that must anneal to the binding site for the second primer and at least one base of the molecule that includes the target for the amplifying step to proceed. Preferably the method is performed in multiplex using a plurality of chimeric second primers specific for a respective plurality of targets, wherein each second primer has at least about three bases at a three prime end that are specific to one target. Optionally the cutting step is multiplexed by using a plurality of Cas endonuclease/guide RNA complexes with diverse guide RNAs specific for a plurality of targets of interest.

What is claimed is:

1. A nucleic acid enrichment method, the method comprising:
   ligating ends of nucleic acid molecules to copies of an adaptor in which one strand includes a sequence of a first primer;
   cutting an adaptor-ligated molecule that includes a target of interest;
   ligating a binding site for a second primer to a cut end of the nucleic acid molecule that includes the target;
   annealing the second primer to the binding site for the second primer and extending the second primer to yield a polynucleotide that includes the second primer, a copy of the target, and a copy of the first primer sequence; and
   amplifying the polynucleotide using copies of the first primer and the second primer.

2. The method of claim 1, wherein the adaptor comprises a second strand that is shorter than the one strand and lacks sequence that is fully complementary to the sequence of the first primer.

3. The method of claim 2, wherein the second strand of the adaptor comprises a 3' dideoxy terminus.

4. The method of claim 1, wherein the method further comprises obtaining a sample from a subject, the sample comprising the nucleic acid molecules.

5. The method of claim 4, wherein the sample is a blood or plasma sample and the nucleic acid molecules comprise cell-free DNA (cfDNA) in the blood or plasma.

6. The method of claim 1, wherein the cutting step is performed by introducing a Cas endonuclease and a guide RNA (gRNA) that specifically targets the Cas endonuclease to the target of interest in one strand of the adaptor-ligated molecule.

7. The method of claim 6, further comprising performing a second set of reactions that includes a second set of all of the recited steps, wherein the second cutting step is performed by introducing a second Cas endonuclease and a second gRNA that specifically targets the second Cas endonuclease to a second target in a strand of the adaptor-ligated molecule that is complementary to the one strand.

8. The method of claim 1, wherein the target is a mutation of interest.

9. The method of claim 8, wherein the mutation comprises a fusion.

10. The method of claim 9, wherein the cutting step is performed by introducing a Cas endonuclease and a guide RNA (gRNA) that specifically targets the Cas endonuclease to the fusion.

11. The method of claim 10, further comprising sequencing tumor DNA from a tumor in a patient to obtain sequence reads, analyzing the sequence reads to discover the presence of the fusion in the tumor DNA, and designing the gRNA to specifically target the fusion.

12. The method of claim 1, wherein the ligating steps include dA tailing available ends optionally after end repair, and incubating with a ligase.

13. The method of claim 1, wherein the step of ligating the binding site for the second primer includes ligating a second adaptor that is double-stranded in which one strand includes the binding site for the second primer.

14. The method of claim 1, wherein the second primer is a chimeric primer that must anneal to the binding site for the second primer and at least one base of the molecule that includes the target for the amplifying step to proceed.

15. The method of claim 14, wherein the method is performed in multiplex using a plurality of chimeric second primers specific for a respective plurality of targets, wherein each second primer has at least about three bases at a 3' end that are specific to one target.

16. The method of claim 14, wherein the cutting step is multiplexed by using a plurality of Cas endonuclease/guide RNA complexes with diverse guide RNAs specific for a plurality of targets of interest.

17. The method of claim 1, further comprising sequencing an amplicon produced by the amplifying step to yield sequence reads, mapping the sequence reads to a reference, and reporting discovery of a fusion when sequence reads from one amplicon map to non-contiguous locations of the reference.

18. A method comprising:
   obtaining a sample comprising a nucleic acid molecule that includes a target of interest;
   ligating adaptors that include a sequence of a first primer sequence to ends of the nucleic acid molecule;
   cleaving the nucleic acid molecule with a Cas endonuclease and a guide RNA specific for the target of interest to leave the nucleic acid molecule with a cut end;
   attaching a binding site for a second primer to the cut end;
   annealing the second primer to the binding site; and
   extending the second primer to create a polynucleotide that includes the second primer, a copy of the target of interest, and a binding site for the first primer.

19. The method of claim 18, wherein the adaptors are double stranded, with a first strand that includes the sequence of the first primer and a second strand that does not include a full complement to the sequence of the first primer.

20. The method of claim 18, wherein the second primer is chimeric and will only be extended by polymerase when at least one 3' base of the second primer anneals to a base of the nucleic acid molecule while a 5' majority of bases of the second primer anneal to the binding site.

21. The method of claim 20, further comprising amplifying the polynucleotide using copies of the first primer and the second primer.

22. The method of claim 18, wherein the sample is a blood or plasma sample from a patient and the nucleic acid molecule is cfDNA in the blood or plasma sample.

23. The method of claim 22, wherein the target of interest is a mutation specific for a tumor from the patient.

24. The method of claim 23, further comprising detecting or analyzing the polynucleotide to indicate the presence of the tumor in the patient.

* * * * *